(12) United States Patent
Bellinger et al.

(10) Patent No.: US 10,171,584 B2
(45) Date of Patent: Jan. 1, 2019

(54) SYSTEMS, METHODS, AND DEVICES FOR PROVIDING PROCESS CODE TO REMOTE DEVICES

(71) Applicant: MARTELLO TECHNOLOGIES CORPORATION, Ottawa (CA)

(72) Inventors: Douglas Bellinger, Ottawa (CA); William Kuker, Fair Haven, VT (US); Eugene Lee, Nepean (CA)

(73) Assignee: MARTELLO TECHNOLOGIES CORPORATION, Ottawa (CA)

( * ) Notice: Subject to any disclaimer, the term of this patent is extended or adjusted under 35 U.S.C. 154(b) by 607 days.

(21) Appl. No.: 14/954,348

(22) Filed: Nov. 30, 2015

(65) Prior Publication Data

US 2017/0155718 A1  Jun. 1, 2017

(51) Int. Cl.
*G06F 9/44* (2018.01)
*H04L 29/08* (2006.01)

(52) U.S. Cl.
CPC .................. *H04L 67/1097* (2013.01)

(58) Field of Classification Search
CPC ....................................................... G06F 9/44
USPC ................................. 717/124–128
See application file for complete search history.

(56) References Cited

U.S. PATENT DOCUMENTS

| | | | |
|---|---|---|---|
| 5,561,769 A | 10/1996 | Kumar et al. | |
| 6,658,585 B1 | 12/2003 | Levi | |
| 6,941,179 B2 | 9/2005 | Takemoto et al. | |
| 7,181,766 B2 | 2/2007 | Bendinelli et al. | |
| 7,577,731 B2 | 8/2009 | Frey et al. | |
| 7,580,985 B2 | 8/2009 | Motoyama et al. | |
| 7,603,671 B2 | 10/2009 | Liu | |
| 7,636,318 B2 | 12/2009 | Nandy et al. | |
| 8,001,228 B2 | 8/2011 | Inamdar et al. | |
| 8,055,746 B2 | 11/2011 | Spicer et al. | |
| 8,196,112 B1 * | 6/2012 | Cansizlar | G06F 17/30905 717/116 |
| 8,244,844 B2 | 8/2012 | Choi et al. | |
| 8,656,013 B2 | 2/2014 | He | |
| 8,774,760 B2 | 7/2014 | Ryali et al. | |
| 8,812,636 B2 | 8/2014 | Song et al. | |
| 9,001,685 B1 | 4/2015 | Lushear et al. | |
| 2002/0097721 A1 | 7/2002 | McKenzie et al. | |
| 2002/0120730 A1 | 8/2002 | Goudzwaard et al. | |

(Continued)

*Primary Examiner* — Jae U Jeon
(74) *Attorney, Agent, or Firm* — Perry + Currier Inc.

(57) ABSTRACT

A data processing device, such as a monitoring agent, runs process code to process input data captured from a data source of a production environment, such as managed network devices. The process code can be created on or modified at a terminal of a development environment remote from the data processing device. The input data can be routed to the development environment to test the process code with actual data. The development environment can also provide test data to the process code to test edge cases and other situations. The output of the process code running in the development environment can be routed to the data processing device for output to downstream systems as if generated by the data processing device. Once the process code is operating satisfactorily at the development environment, the process code can be transmitted to the data processing device for execution in the production environment.

15 Claims, 5 Drawing Sheets

(56) References Cited

U.S. PATENT DOCUMENTS

| | | | |
|---|---|---|---|
| 2003/0078959 A1* | 4/2003 | Yeung | G06F 8/62 |
| | | | 709/201 |
| 2004/0015823 A1* | 1/2004 | Nolan | G06F 8/20 |
| | | | 717/104 |
| 2005/0267928 A1 | 12/2005 | Anderson et al. | |
| 2007/0220157 A1 | 9/2007 | Gattu et al. | |
| 2008/0133765 A1 | 6/2008 | Porel et al. | |
| 2009/0138583 A1 | 5/2009 | Childress et al. | |
| 2010/0296402 A1 | 11/2010 | Fraccalvieri et al. | |
| 2012/0036253 A1 | 2/2012 | D' Alterio et al. | |
| 2013/0246594 A1 | 9/2013 | Ahmad | |
| 2016/0132309 A1* | 5/2016 | Rajasekhar | G06F 8/60 |
| | | | 717/102 |
| 2016/0134476 A1* | 5/2016 | Kerber | H04L 67/104 |
| | | | 709/221 |

\* cited by examiner

SYSTEMS, METHODS, AND DEVICES FOR PROVIDING PROCESS CODE TO REMOTE DEVICES

FIELD

This disclosure relates to computers and networks.

BACKGROUND

Development and testing of computer code can be a lengthy and challenging process. For code that executes within commercial computer networks, development and testing challenges are magnified due to the increased demands and performance expectations for such networks.

For example, concerning computer code that is designed to monitor the operation of a type of network device (e.g., by using the Simple Network Management Protocol, SNMP), a common practice is to physically obtain such a network device and connect it to a test apparatus that includes a computer or other device loaded with monitoring code that is being developed or updated to support the type of network device. Tests are conducted, and the behaviour of the network device is monitored and the code is modified accordingly. This process is resource intensive and suffers from a long development cycle. Hence, some types of network devices go unsupported, or supported only to older versions, for much of their deployment.

Other applications of software can suffer from such drawbacks as well.

In addition, it is often the case that computer code is developed and tested for expected data and only faces actual data when put into production. Such code must then be removed from production, or rolled back, if actual data ends up causing undesirable operation. Moreover, discovering undesirable operation in downstream systems that depend on the output of such computer code may not be practical or possible before deployment.

Numerous other drawbacks of conventional systems and techniques will also be apparent to those in the art.

SUMMARY

According to one aspect of the invention, a system for providing executable code to a remote data processing device includes a remote data processing device storing process code and configured to receive input data from a data source of a production environment. The remote data processing device is further configured to execute the process code with the input data to generate processed data in the production environment. The system further includes a terminal connected to the remote data processing device via a network. The terminal is configured to obtain the process code executing at the remote data processing device. The terminal is further configured to provide a development environment to allow creation of process code and modification of the process code obtained from the remote data processing device to generate new process code. The terminal is further configured to transmit the new process code over the network to the remote data processing device for execution by the remote data processing device. The terminal is configured to receive the input data from the data source of the production environment and to execute the new process code on the input data to generate processed data at the development environment.

The terminal can be further configured to selectably control routing of input data to the new process code as being from the data source of the production environment or from a data source of the development environment.

The data source of the development environment can include one or more of a user interface for entering and modifying input data and storage for storing input data.

The terminal can be further configured to selectably route the processed data generated at the development environment to the remote data processing device for output by the remote data processing device as if generated by the remote data processing device.

The terminal can be further configured to control selective suppression of output of processed data generated by the remote data processing device.

The system can further include a server configured to transmit the process code to the terminal, the server further configured to receive the new process code from the terminal and transmit the new process code to the remote data processing device.

The terminal can be further configured to display at a user interface of the terminal the processed data generated at the development environment.

The terminal can be further configured to store the processed data generated at the development environment in association with the input data.

The remote data processing device can include a monitoring agent for monitoring operation of at least one network device.

According to another aspect of the invention, a monitoring agent device includes memory configured to store base executable code and process code, and a processor configured to execute the base executable code. The processor is further configured to execute the process code via the base executable code with input data received via a network from one or more managed network devices to generate processed data. The processor is further configured to output the processed data generated by the process code to a monitoring manager. The base executable code is configured to selectably transmit the input data to a remote terminal for execution in a development environment. The base executable code is further configured to receive processed data from the remote terminal and to selectably output the processed data received from the remote terminal to the monitoring manager.

According to another aspect of the invention, a process for providing executable code to a remote data processing device includes receiving process code at a development environment, selecting a source of input data from at least a development data source in the development environment and a remote data processing device in a production environment remote from the development environment, executing the process code in the development environment with the input data to generate processed data, selectably outputting the processed data at one or more of the development environment and the production environment, and transmitting the process code to the remote data processing device for execution in the production environment.

Receiving process code at the development environment can include receiving the process code from the remote data processing device.

Transmitting the process code to the remote data processing device and receiving the process code from the remote data processing device can be performed through a server that stores the process code.

Receiving process code at the development environment can include receiving entry of process code or modification to process code at a user interface of the development environment.

Receiving process code at the development environment can include receiving process code from storage at the development environment.

The method can further include receiving modification to the process code at the development environment and executing the process code as modified in the development environment with the input data to generate the processed data.

The method can further include transmitting the processed data from the development environment to the remote data processing device for output by the remote data processing device as if generated by the remote data processing device.

The method can further include suppressing output of processed data generated by the remote data processing device.

The method can further include storing the input data and the processed data in association at the development environment.

BRIEF DESCRIPTION OF THE DRAWINGS

The drawings illustrate, by way of example only, embodiments of the present disclosure.

DETAILED DESCRIPTION

The present invention provides systems, processes, and other techniques to solve at least one of the problems of the prior art. Code under development can be written, updated, and tested with actual production data in real time or near real time without deployment into the production environment. In addition to actual data, development-specific test data, such as that for testing edge cases, can be selectably provided to the code. Undesirable operation of the code and of downstream systems can be detected quickly and easily. When the code is operating satisfactorily, it can be readily transmitted to the production environment for immediate deployment.

Figure 1:
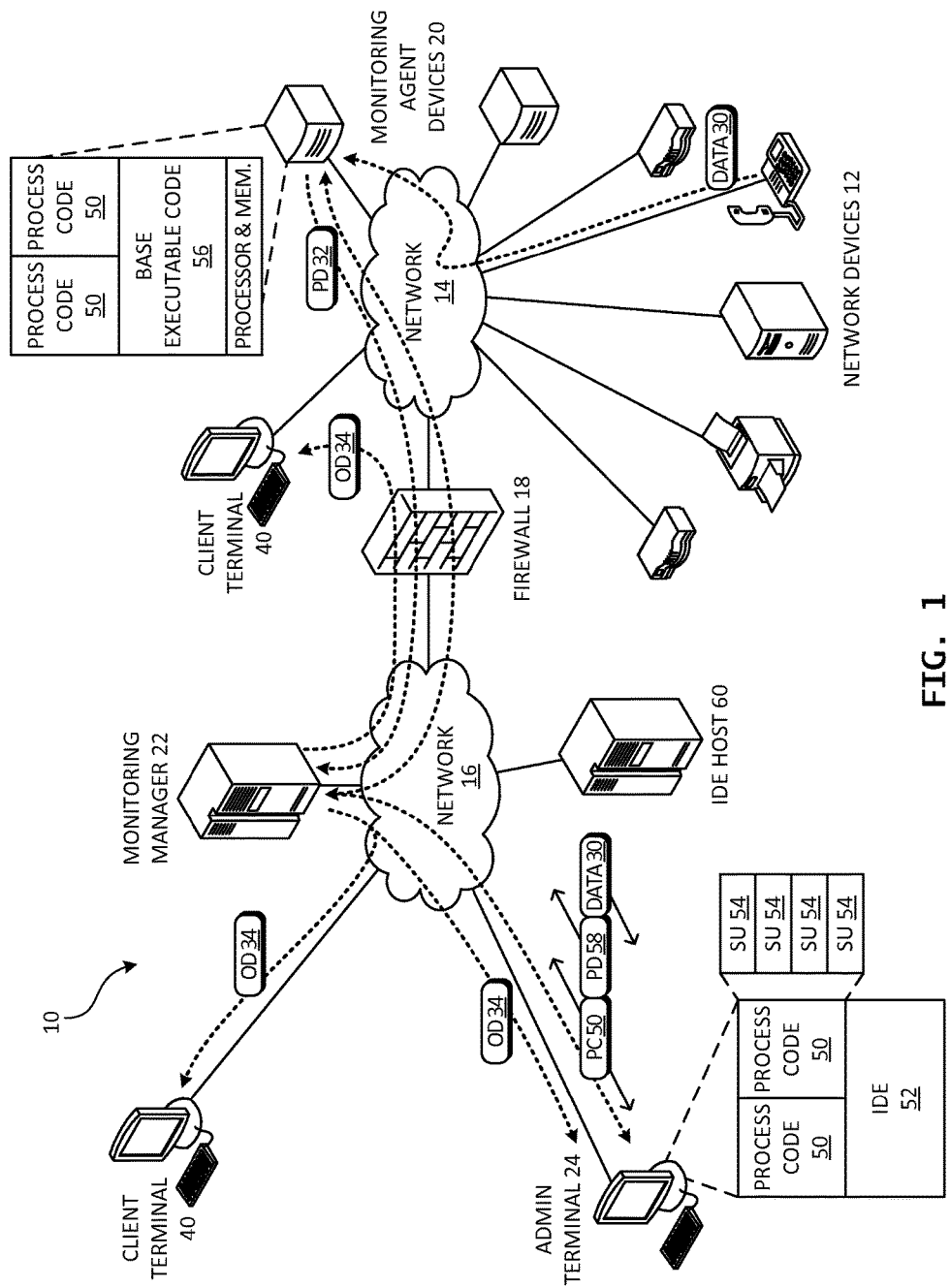
FIG. 1 is a system diagram according to an embodiment of the present invention.

FIG. 1 shows a system 10 according to an embodiment of the present invention. The system 10 is configured to manage the operation of network devices 12 operating within a network 14. The network 14 can include any computer network or combination of networks, such as a local-area network (LAN), an intranet, a wide-area network (WAN), a wireless network, a cellular data network, and similar. Network devices 12 may be termed managed devices and can include any data-enabled electronic devices that communicate via a computer network, such as digital telephones (e.g., Internet protocol, IP, or voice-over IP, VoIP), routers, switches, power sources (e.g., uninterruptable power supplies, UPSs), servers, client computers, load balancers, wireless access points, printers, modems, filters, hubs, bridges, repeaters, audio/video devices (e.g., teleconference devices), unified communications devices, security devices, and similar. The system 10 can operate with any number of distinct networks 14, which are production environments that are contemplated to be controlled by various different parties.

In this embodiment, the system 10 is configured to operate according to the Simple Network Management Protocol (SNMP). In other embodiments, the system 10 can be configured to operate according to other protocols. For sake of illustration, the SNMP will be referenced for various examples discussed herein, but this should not be taken as limiting.

The network 14 is connected to another network 16 via a firewall 18 or similar device. The network 16 can include any computer network or combination of networks, such as a LAN, an intranet, a WAN, a wireless network, a cellular data network, the Internet, and similar. The firewall 18 is configured to prevent unauthorized access to the network 14.

The system 10 includes monitoring agent devices 20 (also termed probes), a monitoring manager 22, and one or more remote administrator terminals 24. The monitoring agent devices 20 receive status and alert data from associated network devices 12 and report such to the monitoring manager 22, which processes such data for output to administrators of the network 14 and/or for storage. The administrator terminal 24 is advantageously capable of remotely configuring functionality of the monitoring agent devices 20 to support new and upgraded network devices 12. Such remote configuration of functionality can be performed in real time or near real time, as the managed network devices 12 are operating normally, with reduced or minimal disruption to the output at the monitoring manager 22.

The monitoring agent devices 20 are remote data processing devices configured to operate within the network 14. In this embodiment, the monitoring agent devices 20 are SNMP managers configured to monitor the operation of network devices 12 (often termed managed devices in SNMP) by receiving input data 30, such as status data and alert data, from the network devices 12, which act as sources of input data in a production environment. Input data 30 is sometimes termed a "management information base" or "MIB". Each monitoring agent device 20 is associated with one or more network devices 12 from which it collects data. Such associations may be created, destroyed, and maintained by the monitoring manager 22 and monitoring agent devices 20. The monitoring agent devices 20 are configured to process input data received from the network devices 12 into processed data 32 for output to the monitoring manager 22. For example, SNMP responses and SNMP Traps are mapped into performance and alarm attributes in the system database. A monitoring agent device 20 may be a computer that has a processor and memory specifically and exclusively configured to operate as an SNMP manager. A monitoring agent device 20 may be plug computer, such as a SheevaPlug device available from Marvell. Alternatively, a monitoring agent device 20 may be a managed network device 12 executing a monitoring agent program.

The monitoring manager 22 is connected to the network 16. The monitoring manager 22 is configured to receive processed data 32 from the monitoring agent devices 20 and to format the processed data 32 for output and/or storage as output data 34. The monitoring manager 22 may be further configured to perform further processing, such as normalization and aggregation, on the received processed data 32. In this embodiment, the monitoring agent device 20 is an SNMP manager configured to send SNMP Requests to and receive SNMP Responses and Traps bearing data 30 from the network devices 12. This information is transformed by the monitoring agent device 20 into processed data 32 and sent to the monitoring manager 22. The monitoring manager 22 may include one or more computers which may be termed servers.

The further processing performed by the monitoring agent 20 on the data 30 received from the network devices 12 may include normalization of network device status data and alerts. For example, a particular router's load may be outputted as an integer and another router's load may be outputted as multiple floating-point values representative of averages over predetermined times. The monitoring agent devices 20 are configured to recognize such values as load metrics, normalize them, and send them to the monitoring manager 22. The monitoring agent device 20 can be configured to normalize the load values to a consistent range, such as a percentage, for output and/or storage. The monitoring manager 22 may be configured to aggregate data from several networks 14.

Client terminals 40 are connected to one or both of the networks 14, 16. The client terminals 40 are configured to connect to the monitoring manager 22 to display output data provided by the monitoring manager 22. Client terminals 40 may be used by administrators of the network 14 to monitor the network's operations, performance, and health.

The administrator terminal 24 is configured to allow development and modification of process code 50 that is to be deployed to the monitoring agent devices 20 for execution to control the processing of data 30 performed by the monitoring agent devices 20. The administrator terminal 24 includes an integrated development environment (IDE) 52, or at least a client-side portion thereof, for development and modification of the process code 50. The administrator terminal 24 is part of, or is entirely, a production environment.

Client terminals 40 and admin terminals 24 can be the same class of device with the same access privileges. Alternatively, admin terminals 24 can be given a higher level of access privileges via authorization of credentials or similar establishment of trust. Client terminals 40 may be kept internal to the network 14, while admin terminals 24 may be internal or external. In some examples, a single terminal acts as both a client terminal 40 and an admin terminal 24. Client terminals 40 and admin terminals 24 may be identical. Generally, client terminals 40 and admin terminals 24 are computers or similar devices and are otherwise not particularly limited.

Communications among the monitoring manager 22, the monitoring agent devices 20, and the terminals 24, 40 can be facilitated by various protocols and techniques, including Transmission Control Protocol/Internet Protocol (TCP/IP), Secure Sockets Layer (SSL), Secure Shell (SSH), SSH tunneling, a Virtual Private Network (VPN), a combination of any of such, and similar. U.S. patent application Ser. No. 14/375,504 (Published as Pub. No. 2015/0150114), which is incorporated herein by reference, describes various suitable techniques. Establishing and maintaining associations between the monitoring agent devices 20 and the network devices 12, as well as communications there-between, can also be achieved using available techniques, such as those discussed in the above-mentioned patent application.

Each monitoring agent device 20 may store and execute multiple units of process code 50 based on the types of network devices 12 with which the monitoring agent device 20 is associated. The type of a network device 12 may be distinguished by its role (e.g., router, switch, IP phone, etc.), its model, its capabilities, its configuration, its software version, and similar factors. For instance, a monitoring agent device 20 associated with a router and a plurality of IP phones may include one unit of process code 50 for the router and two distinct units of process code 50 for two different software versions of the same model of IP phone. It is noted that network devices 12 may be added, removed, and upgraded, thereby often requiring update to the relevant process code 50. Initial deployment and update of process code 50 is facilitated by the system 10 with several advantages, as will be discussed in detail below.

Each unit of process code 50 for a type of network device 12 can be made of up one or more subunits 54 of code, such as a subunit defining a schema for requesting data from a network device 12, a subunit for parsing a response from the network device 12 containing status data, a subunit for parsing a response from the network device 12 containing version data, a subunit for parsing an alert message received from the network device, and similar. Each subunit 54 of code can be aligned with particular functionality. Thus, a unit of process code 50 defines the overall data processing functionality of a monitoring agent device 20 for a particular type of network device 12, and each subunit of the unit defines a particular aspect of such data processing functionality. Alternatively, subunits are not used and a unit is the smallest element of process code.

In this embodiment, a unit is a bundle, package, or collection of subunits, which are individual scripts that define variables, functions, methods, classes, regular expressions, or other similar programmatic entities. Subunits may be configured to make calls to other subunits and one subunit may be designated as the main point of entry for execution, but this is not required. In this embodiment, JavaScript is used for the subunits, although this is not limiting. In other embodiments, other languages can be used and subunits are programs, classes, modules, or other programmatic entities.

Process code 50 can be created and updated at the admin terminal 24 with use of the IDE 52. At any time, any unit or subunit of process code 50 can be transmitted to the monitoring agent device 20 for immediate use in the production environment of the network 14.

Each monitoring agent device 20 includes base executable code 56 that is not deployable or modifiable in the same manner as the process code 50. The base executable code 56 handles lower level functionality, such as network communications, to ensure that data 30 is captured from the associated network devices 12. The base executable code 56 can be configurable by remotely editable settings, parameters, configuration files, or similar to select the kind of data 30 captured, the frequency of capture, and similar. The base executable code 56 is also configured to execute the process code 50, periodically or as triggered by receiving new data 30. To this end, the base executable code 56 can include an enumeration or registration function that identifies the units of process code 50 present at the monitoring agent device 20 and further includes external calls to any identified units of process code 50. The base executable code 56 can thus execute any present units and subunits of process code 50, whether such code is newly added or modified. In this embodiment, the base executable code 56 includes Java bytecode that contains classes, interfaces, etc. for the functionality discussed above, a Java virtual machine that executes the Java bytecode, and an operating system that hosts the Java virtual machine and performs low-level functions. In the example of Java, base executable code 56 can include classes that implement the ScriptEngine interface, or similar, to execute process code 50.

The IDE 52 includes a user-interface for entering and editing process code 50, as well as initiating the transmission of process code 50 between the admin terminal 24 and selected monitoring agent devices 20. The IDE 52 further includes an execution environment for executing the process code 50 at the admin terminal 24, which advantageously allows testing of the process code 50 before sending it to a monitoring agent device 20. The IDE 52 further includes dataflow controls to selectably route input data and output data to/from the instances of process code 50 at the admin terminal 24 and at monitoring agent devices 20. Advantageously, actual production data 30 can be routed to process code 50 executing at the admin terminal 24 to process the data 30 and output the results at the admin terminal 24 for review and evaluation. Additionally or alternatively, the results of processing by the process code 50 executing at the admin terminal 24 can be returned to the relevant monitoring agent device or devices 20, as processed data 58, for delivery to the monitoring manager 22, while bypassing the process code 50 at the monitoring agent device or devices 20. Further, additionally or alternatively, a closed-loop can be implemented such that test input data can be fed to the process code 50 executing at the admin terminal 24 so that test results can be reviewed and evaluated at the admin terminal 24. Any of these pathways can be implemented to selectably allow for testing of process code 50 with actual or test data without interfering with operation of the monitoring agent devices 20, so as to allow smooth and efficient deployment and updating of functionality of the monitoring agent devices 20.

In this embodiment, the IDE 52 includes a user agent, such as a web browser (e.g., Google Chrome, Firefox, etc.), and one or more web pages. The web browser is capable of executing JavaScript. The one or more web pages are configured to establish an environment for obtaining, entering, displaying, editing, and transmitting/receiving process code 50, as well as for selecting input data and routing or displaying output data of the process code 50, in addition to other related functions of the IDE 52.

The execution environments provided by the IDE 52 and the base executable code 56 are identical or sufficiently similar so that the same process code 50 operates substantially the same way in both environments. That is, the same input data 30 results in production processed data 32 being the same as development processed data 58 irrespective of execution environment. This can be achieved by configuring the IDE 52 and base executable code 56 appropriately.

In this embodiment, the monitoring manager 22 is configured to store production versions of process code 50 that are distributed to the relevant monitoring agent devices 20 for execution. The monitoring manager 22 responds to requests for process code 50 from monitoring agent devices 20 by transmitting new and updated process code 50 to the monitoring agent devices 20. That is, the monitoring manager 22 implements an asynchronous update mechanism that flags updated or new process code 50, as provided by an admin terminal 24, for distribution to the affected monitoring agent devices 20. The monitoring manager 22 also responds to requests for process code 50 from an admin terminal 24 by transmitting process code 50 to the admin terminal 24 for development purposes. The monitoring manager 22 is further configured to receive process code 50 going into production from the admin terminal 24. In addition, the monitoring manager 22 is configured to transmit data, such as data 30 and processed data 58, between the admin terminal 24 and the monitoring agent devices 20. Generally, communications as discussed herein between the admin terminal 24 and the monitoring agent devices 20 occur via the monitoring manager 22, in this embodiment. In other embodiments, the admin terminal 24 and the monitoring agent devices 20 communicate directly.

The system 10 can further include an IDE host 60 that is connected to the network 16 and that forms part of the IDE 52. The IDE host 60 is configured to host the web pages that define the IDE environment for remote access by admin terminals 24. The IDE host 60 can further be configured for saving of process code 50 for backup or development purposes. Further, the IDE host 60 can be configured to manage connections between admin terminals 24 and networks 14, including any authorization that is required. Alternatively, the IDE 52 can be entirely implemented at the admin terminal 24 with the use of local web pages. In some embodiments, some or all of the functionality of the IDE host 60 can be implemented at the monitoring manager 22.

The IDE 52 can be configured to save test data and test results for future tests of modified or newly created process code 50. Test data and test results can be stored at the IDE host 60 for access by multiple admin terminals 24. This is advantageous, for instance, if a unit of process code 50 is updated to accommodate a change to a network device 12. In such cases, previous test data can be run through the updated unit of process code 50 to ensure that the process code 50 still produces expected results.

In operation, during monitoring of one or more networks 14, status and/or alert data 30 from network devices 12 is collected by associated monitoring agent devices 20. Each monitoring agent device 20 processes collected data 30 and sends processed data 32 to the monitoring manager 22, which formats the processed data 32 for display and/or storage as output data 34. Administrators of the networks 14 can monitor the operation, performance, and health of their networks 14 by using client terminals 40 to connect to the monitoring manager 22 to view and/or download the output data 34.

When a new type of network device 12 is added to a network 14, an administrator can use an administrator terminal 24 to create process code 50 for the new type of network device 12 and test the process code 50 locally at the administrator terminal 24, using entered test data or actual data 30 from the network 14. This can include returning processed data 58 to the monitoring agent device or devices 20 associated with the new type of network device 12, so as to review how the resulting output data 34 is presented by the monitoring manager 22. When the process code 50 performs satisfactorily, the process code 50 can be transmitted to the monitoring agent device or devices 20 associated with the new type of network device 12 for execution as new process code within the network 14.

Similarly, when an existing type of network device 12 is upgraded or otherwise modified, an administrator can use an admin terminal 24 to obtain the existing process code 50 from the associated monitoring agent device or devices 20 for testing at the admin terminal 24 to ensure that the process code 50 still performs satisfactorily. The process code 50 can be tested as above, modified as needed, and transmitted to the associated monitoring agent device or devices 20 for execution within the network 14.

Figure 2:
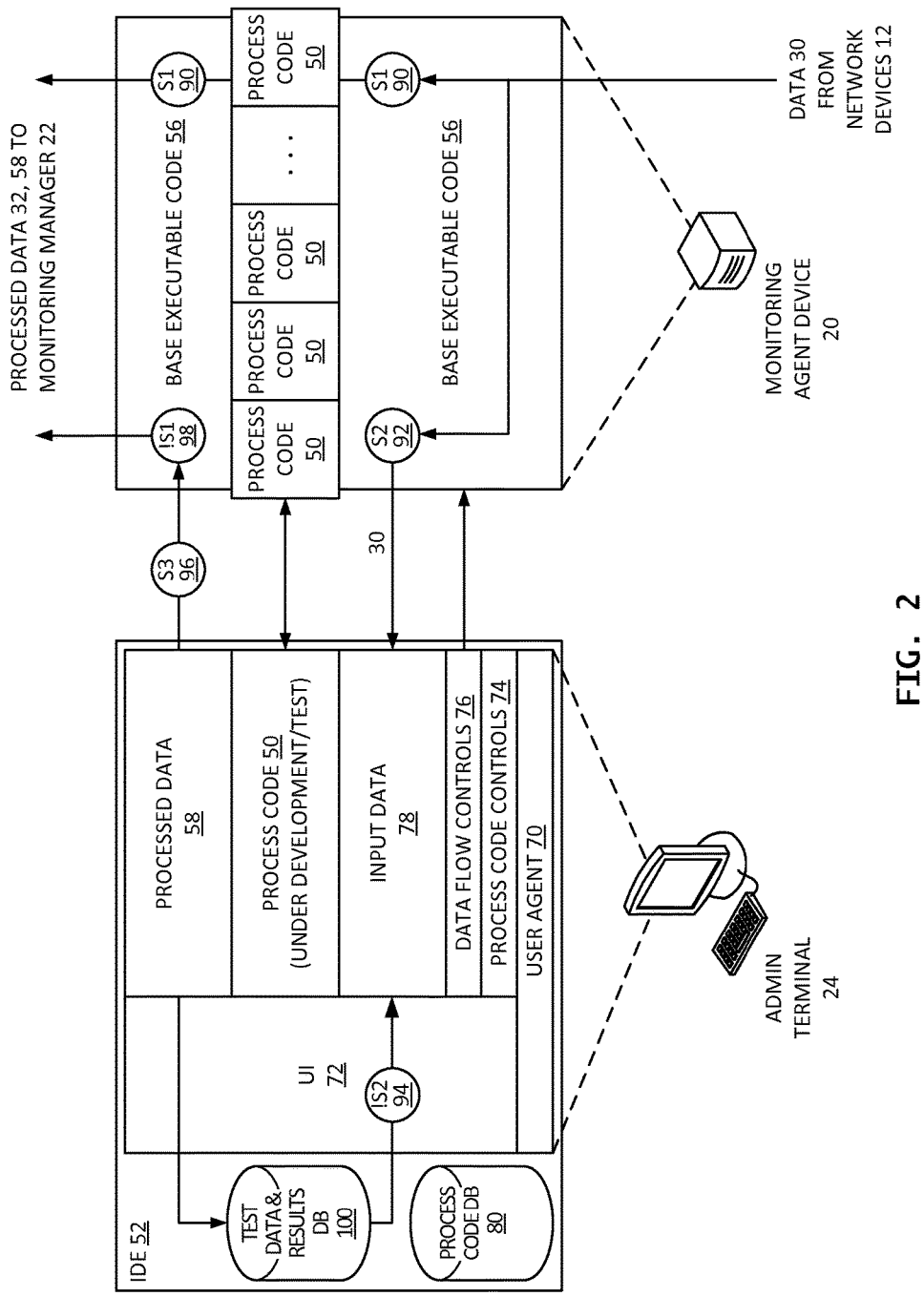
FIG. 2 is a diagram of an admin terminal, IDE, and monitoring agent device.

FIG. 2 shows the admin terminal 24, the IDE 52, and one of the monitoring agents 20, as well as data communications there-between and other functionality.

To implement the IDE 52, the admin terminal 24 executes a user agent 70, such as a web browser, that provides a user interface (UI) 72 perform various tasks on process code 50 under development. The UI 72 is configured to allow user manipulation of process code controls 74, data flow controls 76, input data 78, process code 50 under development, and processed data 58.

Process code controls 74 govern which unit and subunit of process code 50 is being created or modified. Process code controls 74 are further configured to control the transmission of units and subunits of process code 50 between the IDE 52 and the monitoring agent device 20. Process code controls may further be configured to save and load process code 50 with a process code database 80 that forms part of the IDE 52.

Data flow controls 76 control the flow of input and output data. Data flow controls 76 can be configured to modify settings at one or more of the IDE 52 and the monitoring agent device 20. The settings route data to/from the IDE 52 and/or the monitoring agent device 20. Such settings can be implemented as hardware switches, variables, fields, flags, properties, a combination of such, or similar. The settings will be described in the context of switches for illustrative purposes, and this should not be taken as limiting.

An input control switch 90 controls the flow of actual data 30 received from network devices 12 to the process code 50 executed at the monitoring agent device 20, resulting in processed data 32 being sent by the monitoring agent device 20 to the monitoring manager 22 to provide actual output data for network administrators to review. When the input control switch 90 is unset, output of processed data 32 by the monitoring agent device 20 is suppressed.

An input bypass switch 92 controls routing of actual data 30 received from network devices 12 at the monitoring agent device 20 to the IDE 52 to become input data 78 operated on by the process code 50 under development at the IDE 52. When the input bypass switch 92 is set to allow flow of actual data 30 to the IDE 52, other sources of input data 78 in the development environment are suppressed as indicated at 94. Conversely, when the input bypass switch 92 is unset to prevent flow of actual data 30 to the IDE 52, then other sources of input data 78 are allowed.

Other sources of input data in the development environment include direct user entry of input data 78 at the UI 72 and loading of test data as input data 78 from a test data and results database 100. In the case direct user entry of input data 78, current input data 78 as loaded from the database 100 or as received from the monitoring agent device 20 may be edited. That is, input data 78 may be initially received from the monitoring agent device 20, the input bypass switch 92 may then be unset, and the input data 78 may then be manipulated by the admin user conducting the test.

An output feedback switch 96 controls routing of processed data 58 generated by the process code 50 under development to the monitoring agent device 20. The base executable code 56 of the monitoring agent device 20 is configured to forward the processed data 58 to the monitoring manager 22 as if the processed data 58 were generated by the process code 50 at the monitoring agent device 20. The can include the monitoring agent device 20 transmitting the processed data 58 to the monitoring manager 22 as SNMP Responses and Traps in response to SNMP Requests made by the monitoring manager 22. As shown at 98, the base executable code 56 is configured to suppress forwarding of processed data 58 received from the IDE 52 when the input control switch 90 is set to send processed data 32 generated at the monitoring agent device 20 to the monitoring manager 22, so as to avoid sending excess and potentially conflicting data.

In one example of operation, when creating or modifying process code 50 for a particular type of network device 12, any relevant process code 50 present at the monitoring agent device 20 is transmitted to the IDE 52. If no process code 50 exists at the monitoring agent device 20 for the particular type of network device 12 (e.g., it is a new type of device 12), then process code 50 may be started from scratch at the IDE 52 or process code 50 for a similar device may be loaded from the process code database 80.

Then, the input control switch 90 is unset and the input bypass switch 92 is set, thereby diverting actual data 30 away from any process code 50 at the monitoring agent device 20 and to corresponding process code 50 under development at the IDE 52. Further, the output feedback switch 96 is unset, so that the monitoring manager 22 temporarily does not receive any data from the monitoring agent device 20 for the particular type of network device 12. The process code 50 is created or modified via the UI 72 until processed data 58 displayed at the UI 72 appears satisfactory to the admin. Then, the output feedback switch 96 is set to provide the processed data 58 generated by the process code 50 under development to the monitoring manager 22. The admin can then confirm that the final output at the manager 22 is as expected, making any adjustments to the process code 50 under development as needed. The process code controls 74 are then used to transmit the process code 50 under development to the monitoring agent device 20. The input control switch 90 is set and the input bypass switch 92 is unset, thereby routing actual data 30 to the process code 50 at the monitoring agent device 20 for normal operation. Optionally, the process code 50 can be saved to the process code database 80 at the IDE 52.

In another example, input control switch 90 is set so that process code 50 at the monitoring agent device 20 operates normally, and input bypass switch 92 is set so that process code 50 under development can use the same data 30. Process code 50 under development can then be developed and tested while the monitoring agent device 20 operates normally.

In another example, test data is loaded from the database 100 as input data 78 for use by the process code 50 under development. The input bypass switch 92 is unset, so that actual data 30 is not used. Processed data 58 is then compared to test results in the database 100 corresponding to the test data. Advantages of using test data and results database 100 include simplified testing of edge cases and consistent testing of various scenarios over multiple types of devices.

The switches 90, 92, 96 may be implemented in various ways as discussed above. Further, code and any other components of each switch 90, 92, 96 may reside in one or more of the IDE 52, the monitoring manager 22, and the base executable code 56 of the monitoring agent device 20. Where the switches 90, 92, 96 are located depends at least in part on the communications scheme used to connect the IDE 52 to the monitoring agent device 20. In one example, the IDE 52 polls the monitoring agent device 20 for data 30, and the input control switch 90 is implemented at the IDE 52 to set whether the IDE 52 should poll the monitoring agent device 20. In another example, the monitoring agent device 20 transmits data 30 to the IDE 52 as triggered by receiving new data 30 from an associated network device 12. In this case, the input control switch 90 is implemented at the monitoring agent device 20 and is settable from the IDE 52 via a remote command. The monitoring manager 22, as mentioned above, may be configured as an intermediary for data flow between the IDE 52 and the monitoring agent devices 20 and, as such, any necessary switch logic can be implemented at the monitoring manager 22 in addition to or as an alternative to being implemented at the IDE 52 and/or the monitoring agent devices 20. The same applies for the switches 92, 96.

The user interface 72 can be configured to allow display, selection, entry, and/or modification of the process code controls 74, the data flow controls 76, the input data 78, the process code 50 under development, and the processed data 58. To this end, the user interface 72 can include user interface elements, such as text boxes, radio buttons, check boxes, file selectors, and similar. Such user interface elements can be HyperText Markup Language (HTML) elements provided on one or more web pages that are rendered by the user agent 70. The user interface 72 can further include JavaScript web browser tools, such as a console, debugger, and similar.

Figure 3:
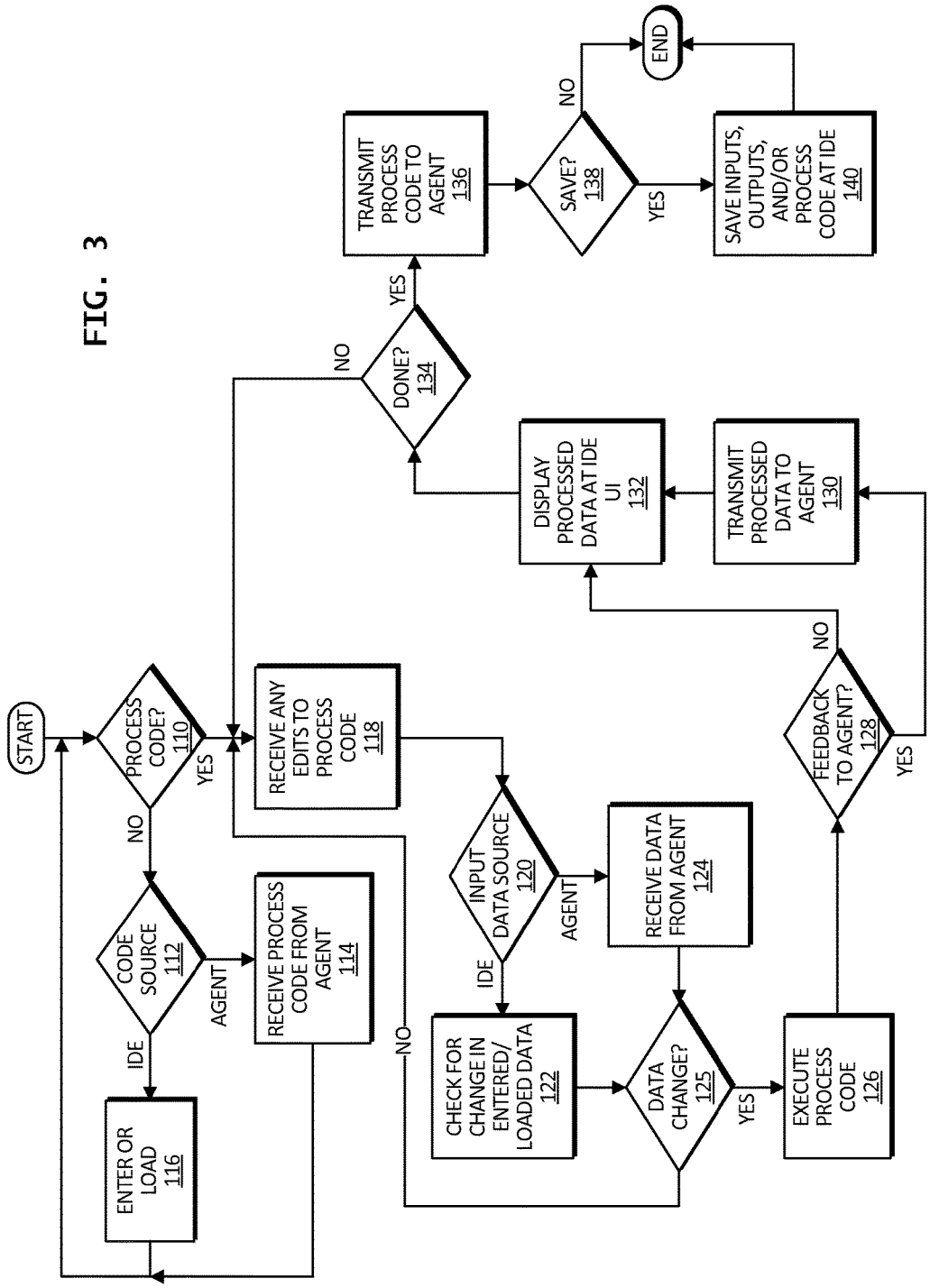
FIG. 3 is a flowchart of a process of creating, updating, and installing process code.

FIG. 3 is a flowchart of a process according to the present invention. The process is performed by an IDE and related components. The process will be described with reference to the IDE 52, but this is not limiting and other IDEs or other components may be used to perform the process.

At step 110, it is determined whether the IDE has process code, such as units or subunits, for a particular type of network device 12, such as a new or updated type of network device.

When the IDE does not have process code for the particular type of network device, the IDE obtains process code from a source, at step 112. Process code can be obtained from a monitoring agent, such as a monitoring agent device 20, associated with the particular type of network device. Alternatively or additionally, process code can be manually entered or loaded into the IDE, at step 116.

Process code can be edited at the IDE, at step 118, which checks for modifications to the process code via the user interface.

An input data source may be selected to provide data for processing by the process code, at step 120. At a given point in time, the input data source can be the IDE, which checks for a change in entered or loaded input data, at step 122. Alternatively, the input data source can be unprocessed data received from the monitoring agent, at step 124. Selection of the IDE, at step 120, when data is already received from the monitoring agent can hold such already received data for editing at the IDE.

Execution of process code is triggered, at step 125, by detection of a change in the data from the input data source. That is, when the input data source is the IDE, a change to the data may arrive via keyboard input or similar. When the input data source is the monitoring agent, a change to the data may originate from a change at the network device. Upon detection of a change to the data, the process code is executed, at step 126, to operate on the changed data from the selected input data source. When the input data does not change, the process loops back to check for any modifications to the process code, at step 118

During execution of the process code, routing of data processed by the process code is determined, at step 128. Processed data can be transmitted to the monitoring agent, at step 130, for reporting to and output at a monitoring manager, such as the monitoring manager 22. The processed data can also be displayed, or otherwise output, at the UI of the IDE, at step 132. The processed data, at step 128, can be selected to not be routed to the monitoring agent, as may be useful when the process code is under development and may be expected to generate errors or unexpected results in process code.

After execution of the process code, at step 134, the process loops back to check for any modifications to the process code, at step 118, until interrupted by, for example, user input at the IDE indicating the process code is operating acceptably.

When it is determined that the process code is operating acceptably at the IDE, then the process code is transmitted to the monitoring agent, at step 136, for execution at the monitoring agent as new process code to process data captured from the new type of network device.

It may be determined, at step 138, that saving process code or data at the IDE is desired. In such case, any selected unit or subunit of process code, input data, and outputted processed data can be saved, at step 140, at the IDE for future use or reference. The outputted processed data, which may be a result of tests, can be stored in association with the input data so as to facilitate repeats of such testing with new or updated process code.

Figure 4:
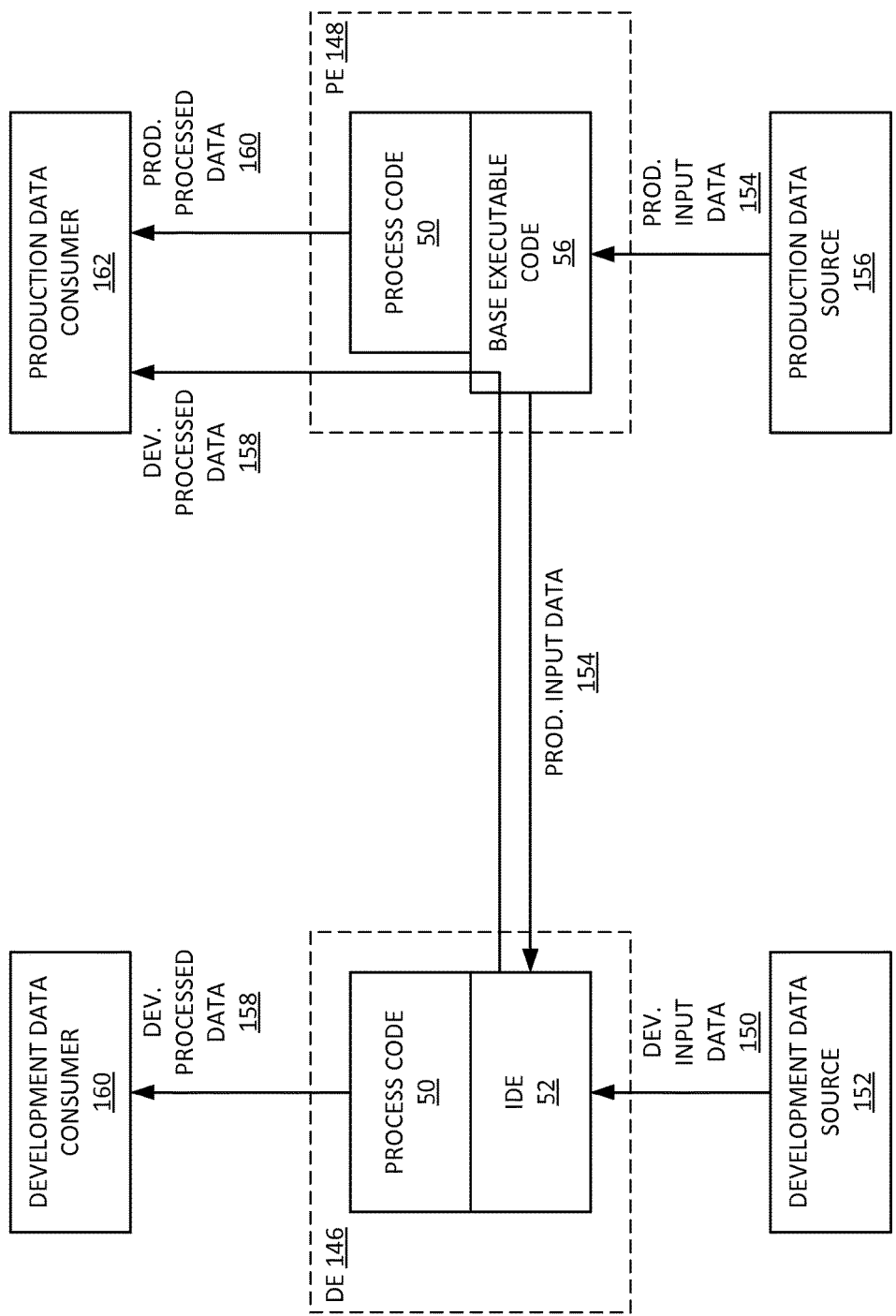
FIG. 4 is a system diagram according to another embodiment of the present invention.

FIG. 4 shows another embodiment of the present invention. This embodiment is similar to that of FIGS. 1 and 2. The above description can be referenced, with like reference numerals denoting like elements.

In a development environment 146, an IDE 52 is configured to support development of process code 50, which is ultimately destined for execution in a production environment 148. The production environment 148 includes base executable code 56 executable on a remote data processing device that stores a production copy of the process code 50 for execution at the production environment 148. The development environment 146 and production environment 148 can include one or more computers or similar data processing devices, and may be connected by a network.

The IDE 52 is configured to obtain process code 50 from a source, such as the production environment 148, storage at the development environment 146, a user interface at the development environment 146, or similar. That is, process code 50 under development can be loaded from the development environment 146 or production environment 148 and can be entered and/or edited via user interface at the development environment 146.

The IDE 52 is further configured to receive development input data 150 from one or more development data sources 152 and to provide the development input data 150 to the process code 50 for processing by the process code 50. Development input data 150 can include human entered or selected data, stored data, and similar. Development input data 150 facilitates testing of the process code 50, particularly for edge cases or unusual input data sets. Development data sources 152 can include a user interface configured to receive typed entry of data, a storage device configured to load input data, a network interface to receive remote data, and similar.

The IDE 52 is further configured to receive production input data 154 from a one or more production data sources 156 and to provide the production input data 154 to the process code for processing by the process code 50. Production input data 154 includes actual data from the production environment, such as measurement data, alert data, status data, inter-process data, communications data, message, data, and similar. Production data sources 156 can include any computer, server, network device, managed network device, or similar. Routing production input data 154 to the IDE 52 and process code 50 under development at the development environment 146 facilitates testing of the process code 50 with actual data in real time or near real time.

The IDE 52 is further configured to output development processed data 158 generated by the process code 50 operating on either the development input data 150 or the production input data 154. The development processed data 158 can be outputted to one or more development data consumers 160, such as display devices and storage devices, at the development environment 146. This can facilitate debugging and archiving of test results.

In normal operation at the production environment, production input data 154 is processed by base executable code 56 and process code 50 in the production environment 148 to output production processed data 160 to one or more production data consumers 162, which can include one or more computer, server, network device, or similar device.

The IDE 52 is further configured to route development processed data 158 to the production environment 148 to bypass of the process code 50 at the production environment 148 for output to the one or more production data consumers 162. The base executable code 56 in the production environment 148 is configured to present the development processed data 158 to the one or more production data consumers 162 as if the development processed data 158 were generated by the process code 50 at the production environment 148. This allows assessment of downstream effects of execution of the process code 50 under development without having to install the process code 50 in the production environment 148.

Once the process code 50 under development is determined to perform satisfactorily, then the process code 50 can be transferred from the development environment 146 to the production environment 148.

One or both of the IDE 52 and the base executable code 56 are configured to handle routing of the production input data 154 to the development environment 146 and routing of development processed data 158 to the production environment 148. The IDE 52 is configured to handle input of the development input data 150 and handle output of the development processed data 158 to the production environment 148.

The source of input data for the testing the process code 50 at the development environment 146 can be selected in real time or near real time as the process code 50 is executing, so that development and testing can be conducted quickly and flexibly. Development processed data 158 can be routed from the development environment 146 to the production data consumer(s) 162 to assist verifying functionality and acceptability of the process code 50 under development at the development environment 146.

The base executable code 56 is not transferable from the production environment 148 in the same manner as the process code 50. The base executable code 56 can include hardware or can be implemented as hardware, exclusively.

Figure 5:
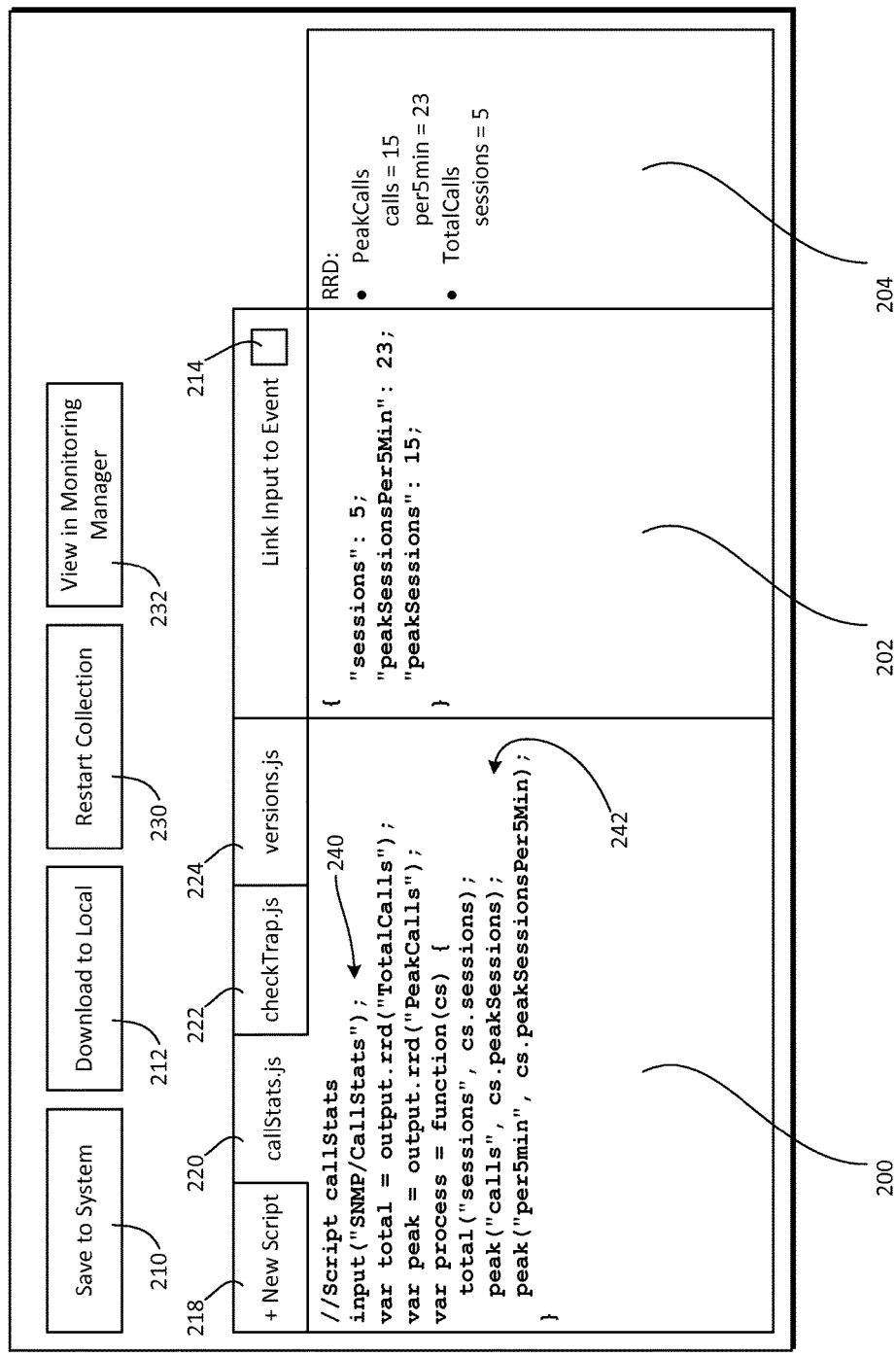
FIG. 5 is a diagram of a user interface showing process code, input data, and processed data.

With reference to FIG. 5, a user interface for the IDE 52 is shown. The user interface is a web page, or similar interface, that can be displayed at an admin terminal 24 (FIG. 1), or similar device. The user interface is configured to allow creation and modification of process code 50 for a type of network device for deployment to relevant monitoring agent devices 20.

The user interface includes a process code editing field 200, input data field 202, and a processed data output field 204. The process code editing field 200 is configured to allow editing of process code 50, or subunits thereof, which can be deployed to relevant monitoring agent devices 20 by a save control 210 (e.g., a save button) and locally downloaded to the admin terminal 24 by a download control 212.

The admin terminal 24 executes process code in the process code editing field 200 using data in the input data field 202 as input and outputting all processed data to the processed data output field 204. A linking control 214 (e.g., a checkbox) toggles whether the input data field 202 is continually updated with data from an actual network device 12 connected to a monitoring agent device 20. The linking control 214 is similar or identical to the input bypass switch 92 discussed above.

A new script control 218 is configured to generate a new unit or subunit of process code for editing in the process code editing field 200. Tab controls 220, 222, 224 are configured to allow selection from among a plurality of units or subunits of process code for a particular type of network device.

A data collection control 230 is configured to trigger the restarting of the collection of input data from a monitoring agent device 20 that is connected to an actual network device 12 being used to develop the process code 50.

A view control 232 is configured to open a user interface for viewing the processed data via the monitoring manager 22. That is, the view control 232 opens a new window or tab that has functionality of the client terminal 40, so that the processed data can be viewed in its final form.

In the process code editing field 200 of FIG. 5, the example process code includes an input statement 240 that captures input data relevant to the function of the process code (in this case obtaining call statistics). The example process code further includes a mapping function 242 that maps input data to specified subcategories, which can be used to normalize the captured input data to system-wide categories and subcategories that are independent of the specific type of network device.

In other examples, process code includes string/number formatting statements or functions, conditional statements that raise alarms, conditional formatting statements, statements that store raw input data or processed data, and similar.

As discussed above, the present invention has at least several advantages over the prior art. Process code under development can be written, updated, and tested with actual production data in real time or near real time without deployment into the production environment. Moreover, test data, such as that for testing edge cases and other unusual circumstances, can be selectably provided to the code to processing to review test results. Undesirable operation of process code, and of downstream systems dependent on outputs of such code, can be detected quickly and easily. Once the process code is operating satisfactorily, it can be quickly transmitted to the production environment for deployment.

While the foregoing provides certain non-limiting example embodiments, it should be understood that combinations, subsets, and variations of the foregoing are contemplated. The monopoly sought is defined by the claims.

What is claimed is:

1. A system for providing executable code to a remote data processing device, the system comprising:
  a remote data processing device storing process code and configured to receive input data from a data source of a production environment, the remote data processing device further configured to execute the process code with the input data to generate processed data in the production environment; and
  a terminal connected to the remote data processing device via a network, the terminal configured to obtain the process code executing at the remote data processing device, the terminal further configured to provide a development environment to allow creation and modification of the process code obtained from the remote data processing device to generate new process code, the terminal further configured to transmit the new process code over the network to the remote data processing device for execution by the remote data processing device;

the terminal configured to receive the input data from the data source of the production environment and to execute the new process code on the input data to generate processed data at the development environment, wherein the terminal is further configured to selectably route the processed data generated at the development environment to the remote data processing device for output by the remote data processing device as if generated by the remote data processing device and wherein the terminal is further configured to control selective suppression of output of processed data generated by the remote data processing device.

2. The system of claim 1, wherein the terminal is further configured to selectably control routing of input data to the new process code as being from the data source of the production environment or from a data source of the development environment.

3. The system of claim 2, wherein the data source of the development environment includes one or more of a user interface for entering and modifying input data and storage for storing input data.

4. The system of claim 1, further comprising a server configured to transmit the process code to the terminal, the server further configured to receive the new process code from the terminal and transmit the new process code to the remote data processing device.

5. The system of claim 1, wherein the terminal is further configured to display at a user interface of the terminal the processed data generated at the development environment.

6. The system of claim 1, wherein the terminal is further configured to store the processed data generated at the development environment in association with the input data.

7. The system of claim 1, wherein the remote data processing device comprises a monitoring agent for monitoring operation of at least one network device.

8. A monitoring agent device comprising:
a memory configured to store base executable code and process code;
and
a processor configured to execute the base executable code, the processor further configured to execute the process code via the base executable code with input data received via a network from one or more managed network devices to generate processed data in a production environment;
the processor further configured to output the processed data generated by the process code to a monitoring manager; and
the base executable code configured to selectably transmit the input data to a remote terminal for execution in a development environment provided by the remote terminal, the base executable code further configured to receive processed data from the remote terminal and to selectably output the processed data received from the remote terminal to the monitoring manager, wherein the base executable code is further configured to output processed data generated at the development environment and selectably routed to the monitoring agent device by the remote terminal as if generated by the monitoring agent device, and wherein the base executable code is further configured to selectively suppress output of processed data generated by the monitoring agent device as controlled by the remote terminal.

9. A process for providing executable code to a remote data processing device, the process comprising:
receiving process code at a development environment;
selecting a source of input data from at least a development data source in the development environment and a remote data processing device in a production environment remote from the development environment;
executing the process code in the development environment with the input data to generate processed data;
selectably outputting the processed data at one or more of the development environment and the production environment, including transmitting the processed data from the development environment to the remote data processing device for output by the remote data processing device as if generated by the remote data processing device, and suppressing output of processed data generated by the remote data processing device; and
transmitting the process code to the remote data processing device for execution in the production.

10. The process of claim 9, wherein receiving process code at the development environment comprises receiving the process code from the remote data processing device.

11. The process of claim 10, wherein transmitting the process code to the remote data processing device and receiving the process code from the remote data processing device are performed through a server that stores the process code.

12. The process of claim 9, herein receiving process code at the development environment comprises receiving entry of process code or modification to process code at a user interface of the development environment.

13. The process of claim 9, wherein receiving process code at the development environment comprises receiving process code from storage at the development environment.

14. The process of claim 9, further comprising receiving modification to the process code at the development environment and executing the process code as modified in the development environment with the input data to generate the processed data.

15. The process of claim 9, further comprising storing the input data and the processed data in association at the development environment.

\* \* \* \* \*